United States Patent [19]
Hornack

[11] Patent Number: 5,849,346
[45] Date of Patent: Dec. 15, 1998

[54] FLAVORED ACID NEUTRALIZING BEVERAGE ADDITIVE HAVING BALANCED ELECTROLYTES

[75] Inventor: Richard S. Hornack, Overland Park, Kans.

[73] Assignee: ChemCraft, Inc., Overland Park, Kans.

[21] Appl. No.: 840,891

[22] Filed: Apr. 17, 1997

Related U.S. Application Data

[60] Provisional application No. 60/015,603 Apr. 18, 1996.
[51] Int. Cl.$^6$ ........................................ A23L 2/00
[52] U.S. Cl. ................................ 426/66; 426/74; 426/590
[58] Field of Search ................................ 426/66, 74, 590

[56] References Cited

U.S. PATENT DOCUMENTS

| | | | |
|---|---|---|---|
| 4,325,975 | 4/1982 | Lindon et al. | ............................. 426/66 |
| 5,306,511 | 4/1994 | Whang . | |

*Primary Examiner*—George Yeung
*Attorney, Agent, or Firm*—Bill D. McCarthy; Randall K. McCarthy; Phillip L. Free, Jr.

[57] ABSTRACT

In one aspect, the present invention provides a solution for neutralizing the acid occurring in acidic beverages such as coffee, tea, wine and other alcoholic beverages, etc. The solution of the present invention provides a concentrated hydroxide solution which can be added dropwise to beverages to neutralize the acid content. By neutralizing the acid in such acidic beverages, the solution of the present invention improves the taste characteristics of such beverages. In another aspect, the solution provides a proper balance of body electrolytes to ensure that the body's system remains in balance. These electrolytes are balanced to match the concentration ratios of the electrolytes contained in the intercellular fluid. The solution prepared in this manner can be stored in conveniently sized dropper bottles so that the beverage additive can be carried in a pocket, purse or the like. In this manner, the beverage additive of the present invention can be added dropwise to any beverage or drink to neutralize acid and to provide a balanced dosage of essential electrolytes. In highly preferred embodiments, the balanced electrolyte, acid-neutralizing beverage additive of the present invention is mixed with a concentrated flavoring constituent.

22 Claims, No Drawings

FLAVORED ACID NEUTRALIZING BEVERAGE ADDITIVE HAVING BALANCED ELECTROLYTES

CROSS REFERENCE TO RELATED APPLICATION

This application claims the benefit of U.S. Provisional patent application Ser. No. 60/015,603, filed Apr. 18, 1996.

BACKGROUND OF THE INVENTION

1. Field of the Invention

The present invention relates broadly to beverage additives for improving the taste and healthfulness of drinks or beverages. More specifically, the present invention relates to beverage additives which neutralize the acidity of the beverage and provide the body a proper balance of needed electrolytes.

2. Description of Prior Art

For centuries man has searched for new ways to modify or treat drinking water to provide a liquid which is both better tasting and more healthful. Grocery store shelves are loaded with an abundance of such products, including coffee, tea, soft drinks, fruit drinks, health drinks, wine and other alcoholic drinks, etc. However, many people are very sensitive to the acid contained in some of these drinks and, therefore, cannot drink them. For instance, the acid in coffee and tea is both distasteful and upsetting to the systems of many people. Although the many available varieties of flavored coffee and tea which are so tremendously popular today help to improve the taste characteristics of these drinks, they do nothing to neutralize the acid which can upset certain people's systems. As another example, many lesser quality wines owe much of their poor taste characteristics to an excess of acid. Thus, although there are many beverages available today, these drinks are not without their drawbacks.

In contrast to the acidic nature of tea and coffee, alkaline drinking water is a product in the health field that has been recognized as being beneficial for some individuals. Alkaline drinking water apparently helps certain persons to balance and regulate their systems, leading to improved health. The primary way of producing this valuable drinking water has traditionally been through the use of water ionizer machines. These machines were developed over 30 years ago in Japan. However, the machines are large and very expensive. The size of these machines is very inconvenient because of the lack of portability. This makes it very impractical to utilize the alkaline water produced from these machines, except while at home. Another drawback of water ionizer machines is that the alkaline water produced from such machines is often unstable, losing its alkalinity within a number of hours.

Another method of producing alkaline drinking water is disclosed in U.S. Pat. No. 5,306,511 issued to Sang Y. Whang (the "Whang patent"). The Whang patent discloses a concentrated alkaline solution formed from a mixture of sodium and potassium hydroxide. The concentrated alkaline solution can be stored in one ounce bottles having a dropper cap. In this way, the concentrated alkaline solution can be easily carried on the person so that it can be added dropwise to an ordinary glass of drinking water to create an alkaline drinking water.

Although the invention according to the Whang patent solves the problem of portability, it comes with its own drawbacks. For instance, by using only potassium and sodium hydroxide to create the concentrated alkaline solution, the Whang invention does not offer a balance of other needed electrolytes. Additionally, such a heavy concentration of potassium and sodium can cause serious problems. For example, because the concentration of sodium in extracellular fluids is high, an increase in the concentration of sodium ions will cause a net movement of water outward from the intracellular area. Water movement will cause the body's cells to shrink. By contrast, if there are more dissolved solids inside the cells than dissolved solids outside, the cells will swell. The imbalance of body electrolytes in the Whang invention can cause problems for many persons by upsetting their electrolyte balance.

Thus, although many beverages are available, there is a continued need for an improved beverage additive that can neutralize unwanted acid and simultaneously provide a proper balance of the bodies primary electrolytes.

SUMMARY OF THE INVENTION

The present invention provides an acid-neutralizing, balanced electrolyte beverage additive which includes an aqueous solution of potassium hydroxide and a mixture of electrolyte ions including sodium, calcium, magnesium, chloride, bicarbonate, phosphate and sulfate. The mixture of electrolyte ions are added to the aqueous solution of potassium hydroxide in proportion to the potassium ion concentration. The proper proportion of each of these additional electrolytes is determined by setting each potassium/electrolyte ratio to the corresponding potassium/electrolyte ratio in the intercellular fluid. Each potassium/electrolyte ratio for the present invention can vary from the ideal ratios by as much as 20% and still be consistent with the present invention. Preferably, though, the ratios will all be within 5% of the ideal values.

The solution prepared in this manner can be stored in conveniently sized dropper bottles so that the beverage additive can be carried in a pocket, purse or the like, so that it can be added to any desired beverage or drink. The concentration of the potassium hydroxide in the beverage additive is a function of the controlled drop volume from the bottle dropper. The concentration of the potassium hydroxide is such that dropwise addition of the beverage additive will adjust the pH of the desired beverage to a range of from about 7 to about 11, and preferably from about 10 to about 10.5. It is convenient for the hydroxide ion concentration of the beverage additive to be such that one to three drops of beverage additive can be added per ounce of desired beverage to adjust the pH of the beverage to the desired range, i.e., 10 to 10.5.

In highly preferred embodiments, the balanced electrolyte, acid-neutralizing beverage additive of the present invention is mixed with a concentrated flavoring constituent.

DETAILED DESCRIPTION OF THE PREFERRED EMBODIMENT

In one aspect, the present invention provides a solution and method for neutralizing the acid occurring in acidic beverages such as coffee, tea, wine and other alcoholic beverages, etc. The solution of the present invention provides a concentrated hydroxide solution which can be added dropwise to beverages to neutralize the acid content. By neutralizing the acid in such acidic beverages, the solution of the present invention improves the taste characteristics of such beverages. For instance, a few drops of the solution of the present invention added to a lesser quality wine neutralizes the acid and thereby removes the undesirable taste characteristics. The result is that the treated wine has improved taste, much like a higher quality wine.

In another aspect, the solution of the present invention provides a proper balance of body electrolytes to ensure that the body's system remains in balance. Electrolytes are any of the various ions required by cells to regulate the electric charge and flow of water molecules across the cell membrane. When dissolved in the body's fluids, electrolytes break apart into positively and negatively charged ions, called cations and anions respectively. These ions provide the energy for the body to function in the manner in which it is designed. The number and concentrations of these ions in body fluids are very important. The primary ions which play roles in the body's metabolic processes are sodium, chloride, potassium, calcium, magnesium, phosphate, carbonate, bicarbonate, and sulfate. When combined with proper circulation and balanced body chemistry, these ions provide the mechanism to maintain proper pH balance and blood pressure, circulate nutrients, rebuild damaged tissues and send waste products from the body.

The concentration of ions from electrolytes also serves to maintain the osmotic equilibrium of the internal water balance of the body. The movement of water molecules through a membrane is known as osmosis. The specific electrolyte content and concentration in the fluids on either side of the membrane control the flow of water; fluid moves from the area of low to high electrolyte concentration in order to equalize the concentrations on both sides of the membrane. If the concentration of any electrolyte, or even pair of electrolytes, is too high in relation to the electrolyte concentration in the intercellular fluid, osmosis will move water from the intercellular regions to the extracellular region, causing the cells to shrink. Therefore, it is important to receive a balanced intake of the body's electrolytes so that the osmotic process can function as intended, resulting in the optimum level of intercellular fluid and electrolytes. The following chart lists the concentration of the body's major electrolytes in the intercellular fluid.

| Cation/Anion | Cation, mEq/L | Anion, mEq/L |
| --- | --- | --- |
| $Na^+$ | 11 | |
| $K^+$ | 164 | |
| $Ca^{++}$ | 2 | |
| $Mg^{++}$ | 28 | |
| $Cl^-$ | | 5 |
| $HCO_3^-$ | | 10 |
| $HPO_4^{--}$ | | 105 |
| $SO_4^{--}$ | | 20 |

The present invention offers a combination of electrolytes that provide the body with a balance of the primary ions needed to carry on metabolic processes. These electrolytes are balanced to match the concentration ratios of the electrolytes contained in the intercellular fluid.

Thus, the present invention uses concentrated potassium hydroxide as an alkaline, acid neutralizing component in an aqueous solution. The body's other major electrolytes, sodium, calcium, magnesium, chloride, bicarbonate, phosphate and sulfate, are added to the aqueous solution in proportion to the potassium. The source chemicals for adding these additional electrolytes is not critical to the present invention so long as each of the source chemicals is nontoxic, physiologically compatible and readily dissolvable in water. The proper proportion of each of these additional electrolytes is determined by setting each potassium/electrolyte ratio to the corresponding potassium/electrolyte ratio in the intercellular fluid. The following chart gives the ratio of the other major electrolytes to potassium in the intercellular fluid.

| | Ideal Ratio | ±20% Ratio Range | ±5% Ratio Range |
| --- | --- | --- | --- |
| $K^+/Na^{+1}$ = | 14.91 | 11.93–17.89 | 14.16–15.66 |
| $K^+/Ca^{+2}$ = | 82.00 | 65.60–98.40 | 77.90–86.1 |
| $K^+/Mg^{+2}$ = | 5.86 | 4.69–7.03 | 5.57–6.15 |
| $K^+/Cl^{-1}$ = | 32.8 | 26.24–39.36 | 31.16–34.44 |
| $K^+/HCO_3^{-1}$ = | 16.4 | 13.12–19.68 | 15.58–17.22 |
| $K^+/HPO_4^{-2}$ = | 1.56 | 1.25–1.87 | 1.48–1.64 |
| $K^+/SO_4^{-2}$ = | 8.20 | 6.56–9.84 | 7.79–8.61 |

As used herein, all ratios are concentration ratios with the concentrations given in mEq/L. Each potassium/electrolyte ratio for the present invention can vary from the ideal ratios listed above by as much as 20% and still be consistent with the present invention. Preferably, though, the ratios will all be within 5% of the ideal values listed above. Potassium hydroxide is chosen because potassium has the highest concentration in the intercellular fluid. Thus, use of potassium hydroxide allows a greater concentration of hydroxide while still balancing the other major body electrolytes.

The solution prepared in this manner can be stored in conveniently sized dropper bottles so that the beverage additive can be carried in a pocket, purse or the like and added to any desired beverage. One ounce sized bottles having a controlled drop delivery of about 0.04 ml/drop have been found to be suitable for this purpose, however, persons skilled in the art will recognize that bottle size and drop volume can be varied in accordance with the present invention.

The concentration of the potassium hydroxide in the beverage additive is a function of the controlled drop volume from the bottle dropper, but will certainly be such that the pH of the beverage additive is between 7 and 14. The concentration of the potassium hydroxide is such that dropwise addition of the beverage additive will adjust the pH of the desired beverage to a range of from about 7 to about 11. For acidic drinks like wine, tea or coffee which one merely desires to neutralize, the pH of the beverage should be adjusted to a pH of about 7. For drinking water or other beverages which one desires to make an alkaline drink, the pH should be adjusted to from about 10 to about 10.5. It is convenient for the hydroxide ion concentration of the beverage additive to be such that one to three drops of beverage additive can be added per ounce of desired beverage to adjust the pH of the beverage to the desired range, i.e., 10 to 10.5.

Theoretically, to adjust the pH of a neutral beverage (for simplicity, a neutral beverage) to a range of from 7 to about 11 using about one drop of beverage additive per ounce of beverage, the pH of the beverage additive should be from about 9.8 to about 13.9, corresponding to a potassium hydroxide concentration range of about $7.4 \times 10^{-5}$M KOH to about 0.74M KOH. This pH range could perhaps be safely broadened to from about 9.5 to about 14.0. Likewise, to adjust the pH of a neutral beverage to about 10.5 using about one drop of beverage additive per ounce of beverage, the pH of the beverage additive should be about 13.34, corresponding to a potassium hydroxide concentration of about 0.23M KOH. As noted above, the concentration of the remaining electrolytes are adjusted to be proportionate to the potassium ion concentration of the beverage additive. In this manner, the beverage additive of the present invention can then be added dropwise to any beverage or drink to neutralize acid and to provide a balanced dosage of essential electrolytes.

When added to drinking water (which should be considered a beverage as used herein), the beverage additive of the present invention creates an alkaline drinking water. Because there is essentially no acid in drinking water, the KOH in the beverage additive of the present invention causes the drinking water to change to a basic pH when the beverage additive is added in a dropwise manner. Of course, the number of drops of the beverage additive which is added to the drinking water will determine the pH of the resultant alkaline drinking water.

In highly preferred embodiments, the balanced electrolyte, acid-neutralizing beverage additive of the present invention is mixed with a concentrated flavoring constituent. The flavoring constituent allows one to flavor the desired beverage and neutralize the acid content of the beverage using a single, convenient additive. It has been found that the miscibility of the flavoring constituent can be improved by adding a small volume of a 40 weight-percent ethyl alcohol solution before mixing the flavoring constituent with the balanced electrolyte, acid neutralizing solution.

The portions of concentrated flavoring constituent and alcohol added to the beverage additive can vary widely according to preference. However, it has been found that such a flavored beverage additive works particularly well if the acid-neutralizing solution comprises from about 20 to about 60 volume percent, the concentrated flavoring constituent comprises from about 20 to about 50 volume percent and the ethyl alcohol solution comprises from about 5 to about 35 volume percent. Of course, the dilution of the acid-neutralizing beverage additive with the alcohol and flavoring constituent must be taken into consideration in adjusting the desired concentration of hydroxide in the flavored beverage additive.

In one embodiment, a solution made in accordance with the present invention is formed by first taking a 375 ml. aliquot of a 45 wt./wt. percent solution of KOH and dilution with deionized ("D.I.") water to a total volume of 2700 ml. Next, 9.375 mg. of $P_2O_5$ are dissolved in 200 ml. of D.I. water, 9.375 ml. of NaCl are dissolved in 200 ml. of D.I. water, 1.2 mg. of CaCl are dissolved in 200 ml of D.I. water, 3.0 mg of $MgSO_4$ are dissolved in 200 ml of D.I. water, and 3.5 mg. of $NaHCO_3$ are dissolved in 165 ml. of D.I. water. These solutions are then added to the 2700 ml solution of diluted KOH for a total volume of about 3665 ml. In this manner, an acid neutralizing beverage additive solution having balanced electrolytes is formed.

An equal volume of a flavoring solution made by mixing one part 40 weight percent alcohol with four parts concentrated flavoring constituent, such as available from Beck's Flavors, Inc., is added to the acid-neutralizing beverage additive to form a flavored, acid-neutralizing beverage additive having balanced electrolytes. The flavored beverage additive is packaged in one ounce dropper bottles each having a controlled drop delivery of 0.04 ml/drop. The user neutralizes the desired beverage by adding from one to three drops of flavored beverage additive per ounce of beverage.

It is clear that the present invention is well adapted to carry out the objects and to obtain the ends and advantages mentioned as well as those inherent therein. While a presently preferred embodiment of the invention has been described for purposes of this disclosure, it will be recognized that numerous changes may be made which will readily suggest themselves to those skilled in the art and which are encompassed within the spirit of the invention disclosed and as defined in the appended claims.

What is claimed is:

1. A beverage additive comprising:
   an aqueous solution of potassium hydroxide; and
   a mixture of electrolyte ions consisting of sodium, calcium, magnesium, chloride, bicarbonate, phosphate and sulfate.

2. The beverage additive of claim 1 wherein the concentration ratio of potassium to sodium is from about 11.93 to about 17.89.

3. The beverage additive of claim 1 wherein the concentration ratio of potassium to calcium is from about 65.60 to about 98.40.

4. The beverage additive of claim 1 wherein the concentration ratio of potassium to magnesium is from about 4.69 to about 7.03.

5. The beverage additive of claim 1 wherein the concentration ratio of potassium to chloride is from about 26.24 to about 39.36.

6. The improved beverage additive of claim 1 wherein the concentration ratio of potassium to bicarbonate is from about 13.12 to about 19.68.

7. The beverage additive of claim 1 wherein the concentration ratio of potassium to phosphate is from about 1.25 to about 1.87.

8. The beverage additive of claim 1 wherein the concentration ratio of potassium to sulphate is from about 6.56 to about 9.84.

9. The beverage additive of claim 1 wherein the pH is from about 9.8 to about 13.9.

10. The beverage additive of claim 1 wherein the pH is from about 9.5 to about 14.0.

11. The beverage additive of claim 1 wherein the concentration ratio of potassium to sodium is from about 11.93 to about 17.89, the concentration ratio of potassium to calcium is from about 65.60 to about 98.40, the concentration ratio of potassium to magnesium is from about 4.69 to about 7.03, the concentration ratio of potassium to chloride is from about 26.24 to about 39.36, the concentration ratio of potassium to bicarbonate is from about 13.12 to about 19.68,the concentration ratio of potassium to phosphate is from about 1.25 to about 1.87, and the concentration ratio of potassium to sulphate is from about 6.56 to about 9.84.

12. The beverage additive of claim 11 wherein the pH is from about 9.8 to about 13.9.

13. The beverage additive of claim 11 wherein the pH is from about 9.5 to about 14.0.

14. The beverage additive of claim 1 wherein the concentration ratio of potassium to sodium is from about 14.16 to about 15.66, the concentration ratio of potassium to calcium is from about 77.90 to about 86.10, the concentration ratio of potassium to magnesium is from about 5.57 to about 6.15, the concentration ratio of potassium to chloride is from about 31.16 to about 34.44, the concentration ratio of potassium to bicarbonate is from about 15.58 to about 17.22, the concentration ratio of potassium to phosphate is from about 1.48 to about 1.64, and the concentration ratio of potassium to sulphate is from about 7.79 to about 8.61.

15. The beverage additive of claim 14 wherein the pH is from about 9.8 to about 13.9.

16. The beverage additive of claim 15 further comprising a flavoring constituent.

17. An alkaline drinking water comprising:
    an aqueous solution of potassium hydroxide; and
    a mixture of electrolyte ions consisting of sodium, calcium, magnesium, chloride, bicarbonate, phosphate and sulfate.

18. The alkaline drinking water of claim 17 wherein the pH is from about 7 to about 11.

19. The alkaline drinking water of claim 18 wherein the concentration ratio of potassium to sodium is from about 11.93 to about 17.89; the concentration ratio of potassium to calcium is from about 65.60 to about 98.40 the concentration ratio of potassium to magnesium is from about 4.69 to about 7.03, the concentration ratio of potassium to chloride is from about 26.24 to about 39.36, the concentration ratio of potassium to bicarbonate is from about 13.12 to about 19.68, the concentration ratio of potassium to phosphate is from about 1.25 to about 1.87, and the concentration ratio of potassium to sulphate is from about 6.56 to about 9.84.

20. The alkaline drinking water of claim 17 wherein the pH is from about 10 to about 10.5.

21. The alkaline drinking water of claim 18 wherein the concentration ratio of potassium to sodium is from about 14.16 to about 15.66; the concentration ratio of potassium to calcium is from about 77.90 to about 86.10 the concentration ratio of potassium to magnesium is from about 5.57 to about 6.15, the concentration ratio of potassium to chloride is from about 31.16 to about 34.44, the concentration ratio of potassium to bicarbonate is from about 15.58 to about 17.22, the concentration ratio of potassium to phosphate is from about 1.48 to about 1.64, and the concentration ratio of potassium to sulphate is from about 7.79 to about 8.61.

22. The alkaline drinking water of claim 21 further comprising a flavoring constituent.

* * * * *

UNITED STATES PATENT AND TRADEMARK OFFICE
CERTIFICATE OF CORRECTION

PATENT NO : 5,849,346
DATED : December 15, 1998
INVENTOR(S) : Richard S. Hornack It is certified that error appears in the above-identified patent and that said Letters Patent is hereby corrected as shown below:

Column 3, line 41, add title --Intracellular Fluid Electrolyte Concentrations--

Column 4, line 5, add title --Potassium/Electrolyte Concentration Ratios--

Column 6, line 42, add a space between 19.68,the --19.68, the--

Column 8, line 4, add a comma after 86.10 -- 86.10,--

Signed and Sealed this

Twenty-seventh Day of March, 2001

Attest:

NICHOLAS P. GODICI

Attesting Officer

Acting Director of the United States Patent and Trademark Office